United States Patent [19]

Zompolas

[11] Patent Number: 4,730,486
[45] Date of Patent: Mar. 15, 1988

[54] PRESSURE RELIEF VALVE EXHAUST GAS HEATING MEANS FOR AIRCRAFT BACKUP PUMP

[76] Inventor: Thomas Zompolas, 7702 Geralayne Dr., Milwaukee, Wis. 53213

[21] Appl. No.: 911,523

[22] Filed: Sep. 25, 1986

[51] Int. Cl.⁴ ............................................. G01C 21/00
[52] U.S. Cl. .................................... 73/178 R; 244/1 R
[58] Field of Search ............ 73/178 R, 384; 244/1 R; 417/3; 60/39.093; 137/341; 303/1

[56] References Cited

U.S. PATENT DOCUMENTS 4,364,268 12/1982 Zompolas ......................... 73/178 R
4,676,454 6/1987 Zompolas et al. .................. 244/1 R Primary Examiner—Donald O. Woodiel
Attorney, Agent, or Firm—Michael, Best & Friedrich

[57] ABSTRACT

An aircraft instrumentation system includes a plurality of air-driven instruments and a primary air pump for operatively driving the instruments. An air pressure regulator, coupled to the primary pump, selectively exhausts compressed air discharged by the primary pump so as to maintain a constant desired pressure at the instruments, and a backup pump is provided for operating the instruments in the event the primary pump fails. To avoid excessive cooling of the backup pump when the backup pump is not being operated and the aircraft is at altitude, a shroud is mounted so as to form an air space around the backup pump. Warm air, heated through compression by the primary pump and exhausted through the pressure regulator, is collected by a housing surrounding the pressure regulator and is conveyed, through a conduit, to the air space to warm the backup pump when the primary pump is operating.

3 Claims, 7 Drawing Figures

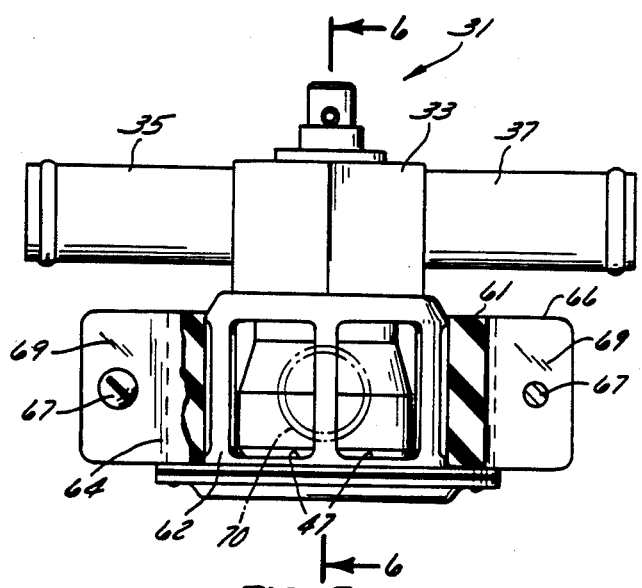
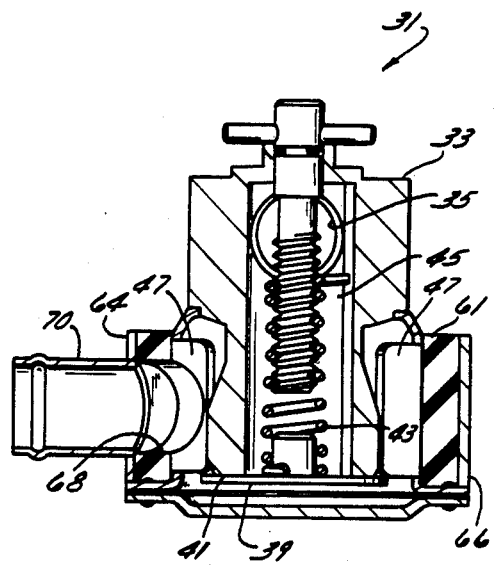
FIG. 5    FIG. 6
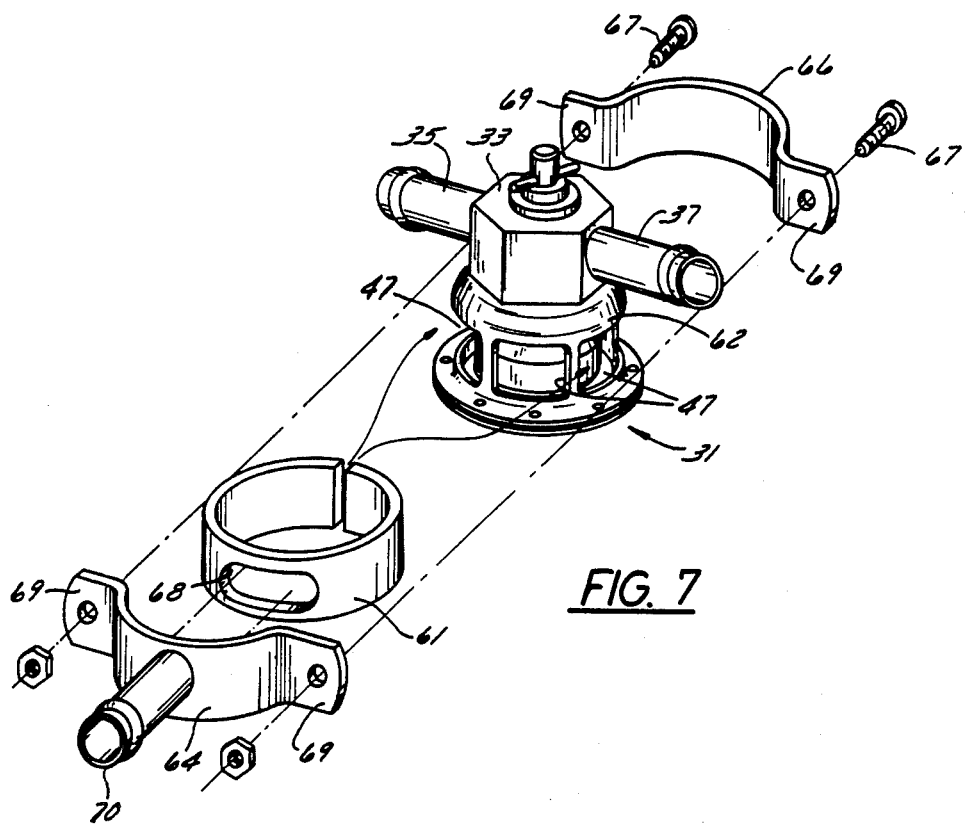
FIG. 7

PRESSURE RELIEF VALVE EXHAUST GAS HEATING MEANS FOR AIRCRAFT BACKUP PUMP

FIELD OF THE INVENTION

The present invention is directed to small light aircraft instruments and to apparatus for heating a backup power source for the instruments to insure operation of the backup power source in the event of failure of a primary power source.

RELATED APPLICATIONS

Attention is directed to applicant's earlier U.S. patent application Ser. No. 798,402 filed Nov. 15, 1985. That application is a continuation-in-part of U.S. patent application Ser. No. 609,434, filed May 11, 1984, now abandoned.

BACKGROUND PRIOR ART

In single engine light aircraft, it is common that a number of the instruments are air pressure operated. These instruments may include a heading indicator, attitude indicator and turn and bank indicator. Applicant's U.S. Pat. No. 4,364,268 issued Dec. 21, 1982, is directed to apparatus for providing a redundant vacuum or air pressure source to provide for continued operation of the aircraft instruments in the event there is a failure of the primary air pressure pump. Such apparatus for providing a backup air pressure source includes a second pump connected to the instruments in such a manner that the second pump is operable in response to failure of the primary pump. In normal practice the backup pump is mounted in the engine compartment forward of the firewall.

Air pumps of the type employed to operate aircraft instruments commonly comprise impeller type pumps having an aluminum housing and a carbon impeller. The pump is constructed such that the planar end faces of the impeller are very closely spaced with respect to opposed planar faces of the aluminum housing. The aluminum forming the housing has a coefficient of expansion of 0.00124 inches per 100° F. The carbon material commonly used in the construction of the impeller commonly has a coefficient of expansion of 0.00025 inches per 100° F. Because of the differences in the rates of expansion of these materials, if the pumps are placed in a very cold environment, for example, −40° C., the aluminum housing may contract sufficiently that the impeller will be immovable and the pump inoperable.

When an airplane is operated at high altitudes, the ambient temperature may be −40° C. or colder, and it is possible that the secondary pump for the aircraft instruments may become so cold that the pump will become inoperable.

SUMMARY OF THE INVENTION

The present invention provides an improved backup pump system and more specifically includes means for heating the backup air pressure pump during operation of the primary pump such that the backup pump will be operational even if the backup pump is first called on at high altitude or otherwise in a very cold environment.

More specifically, the invention includes a pump system for use in an air operated instrument system of an aircraft, the aircraft including an engine, an electrical power source and at least one air operated instrument, the pump system including a primary pump having an air inlet port and an air outlet port for discharging air under pressure. Means are also provided for operably connecting the primary pump to the air operated instruments, this means including a pressure regulating valve for controlling the pressure of the air supplied to the instruments, the pressure regulating valve including an air exhaust port. The pump system also includes a backup pump means for selectively driving the backup pump when the primary pump fails and a means for selectively connecting the backup pump to the instruments when the primary pump fails. Means are also provided for heating the backup pump during operation of the primary pump to maintain the temperature of the backup pump above the temperature where the backup pump will be inoperable. This means for heating the backup pump includes a means for conveying air discharged by the air exhaust port of the pressure regulating valve to the backup pump In a preferred form of the invention at least a portion of the backup pump is surrounded by a container defining an air space surrounding the air pressure pump and the air space being connected by a conduit to the outlet port of the pressure regulating valve.

Various other features and advantages of the invention will be apparent by reference to the following description of a preferred embodiment of the invention, from the drawings and from the claims.

BRIEF DESCRIPTION OF THE DRAWINGS

FIG. 5 is an enlarged view, partially in section of the pressure regulating valve assembly illustrated in FIG. 2.

FIG. 6 is a cross section view taken generally along line 6—6 in FIG. 5.

FIG. 7 is an exploded view of the pressure regulating valve assembly shown in FIGS. 2, 5 and 6.

Figure 1:
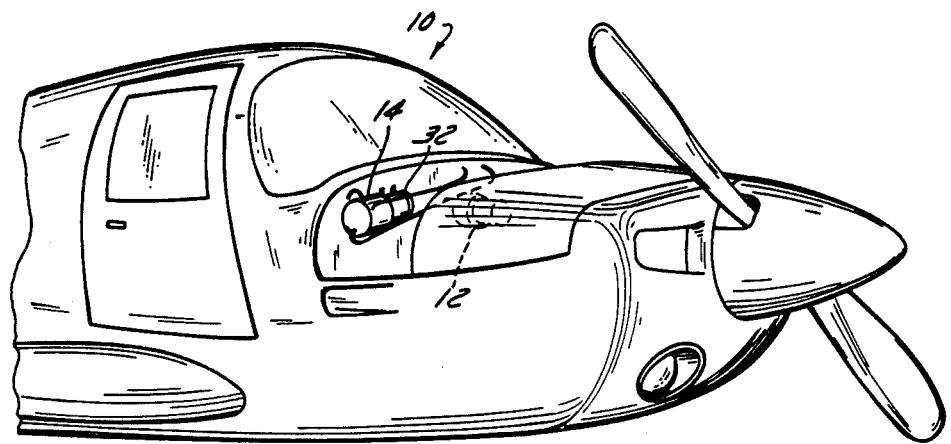
FIG. 1 is a perspective view of a redundant backup pump system embodying the present invention mounted in an aircraft where the instrument system is vacuum operated.

Before describing a preferred embodiment of the invention in detail, it is to be understood that the invention is not limited in its application to the detailed construction and to the arrangement set forth in the following description nor illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Figure 2:
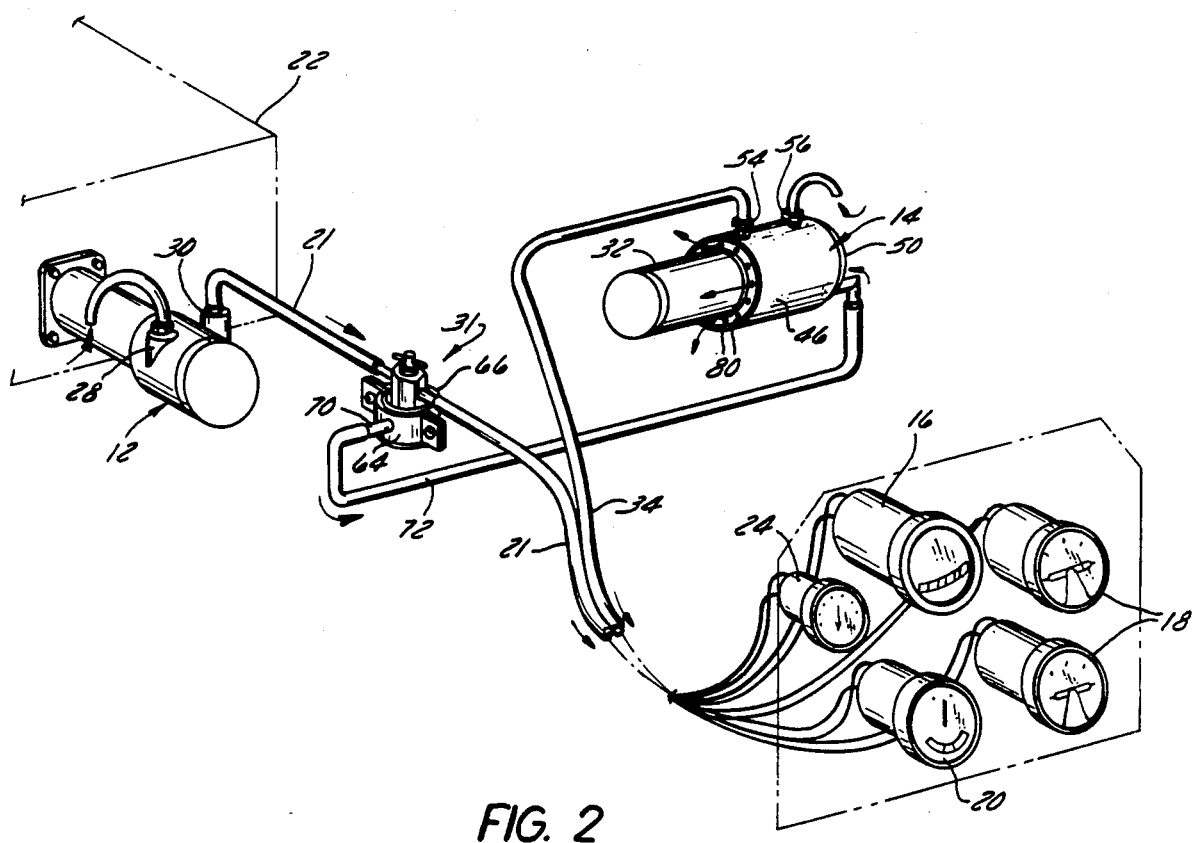
FIG. 2 is an enlarged perspective view of the redundant air pressure pump system shown in FIG. 1.

FIG. 1 shows a small light aircraft 10 including apparatus embodying the invention and including a primary air pressure pump 12 operably connected to instruments of the aircraft and a backup pump 14 adapted to be selectively connected to the aircraft instruments to maintain operation of these instruments in the event of failure of the primary pump 12. Illustrated in FIG. 2 is an aircraft instrument system including a plurality of air pressure operated instruments of the type commonly employed in such small aircraft as shown in FIG. 1. These instruments include a heading indicator 16, attitude indicators 18, and a turn and bank indicator 20. The instruments 16, 18 and 20 are conventional and their operation will not be described in detail. The instruments 16, 18 and 20 are connected in a conventional manner by an air pressure line 21 to the primary pump 12. The primary pump 12 is also conventional and is adapted to be driven by the aircraft engine. In a preferred form of the invention the heading indicator 16, attitude indicators 18 and turn and bank indicator 20 are mounted within the airplane cabin. Also included is a pressure gauge 24 also connected to the air pressure line 21.

While the primary pump 12 is conventional and will not be described in detail, generally it includes a housing containing a conventional rotary impeller operably connected to the engine 22 so as to be rotationally driven by the engine. The pump 12 includes an inlet port 28 and a discharge port 30 connected to the air pressure line 21. In operation of the pump 12, air is drawn into the pump 12 and discharged through the discharge port 30 to the air pressure line 21.

Means are also provided for regulating the air pressure in the air pressure line 21 such that a relatively constant air pressure is supplied to the air pressure operated instruments 16, 18 and 20. This means for regulating air pressure can comprise a conventional air pressure regulating valve 31 operably inserted into the air pressure conduit 21. In one embodiment of the invention the air pressure regulating valve 31 can comprise a model 2H30-9 air pressure regulating valve manufactured by Airborne Division, Parker Hannifin Corporation. Such an air pressure regulating valve can be functional to maintain the supply of air at approximately 2.5 p.s.i. to the aircraft instruments while exhausting the remainder of the air through a discharge port.

While the air pressure regulating valve 31 is conventional and will not be described in detail, as illustrated in FIGS. 5-7, the air pressure regulating valve includes a valve body 33 having an inlet port 35, an outlet port 37, and a valve plate 39 biased against a valve seat 41 by a spring 43. When air pressure in the chamber 45 of the valve body 33 exceeds a selected pressure (e.g. approximately 2.5 psi) the valve plate 39 will be forced away from valve seat 41 to exhaust air through the ports 47.

Means are also included for providing a redundant or backup source of air pressure in the event of failure of the primary pump 12 and for maintaining operation of the instruments 16, 18 and 20 despite such a failure of the primary pump 12 or, failure of the aircraft engine 22. In a preferred form of the invention, the backup source of air pressure will comprise a backup pump 14 having the same construction as the primary pump 12 and being driven by an electric motor 32 adapted to be selectively connected to the battery 36 of the airplane. The backup pump 14 is connected to the air pressure operated instruments by a line 34 and is also adapted to generate air pressure of at least approximately 2.5 psi.

The primary pump 12 and the backup pump 14 are connected to the instruments 16, 18 and 20 in the manner described in applicant's U.S. Pat. No. 4,364,268 and the disclosure of that patent is incorporated herein by reference. As described in that patent, the means for causing actuation of the backup pump 14 can include means for causing elecrical connection of the motor 32 driving backup pump 14 with the airplane battery 36 in the event of a failure of the primary pump 12 causing a drop in the air pressure in line 21 below a predetermined level. As described in applicant's U.S. Pat. No. 4,364,268, this means for causing selective electrical connection can include a switch 38 connected to the line 21. The switch 38 includes normally open switch contacts 40 and means for sensing a decrease in the pressure in the line 21. The switch 38 also includes means for closing the switch contacts in response to an undue decrease in air pressure in the line 21. The circuit also includes a manually armed switch 42 to be closed by the pilot once the engine is started and the primary pump 12 begins to operate. During normal operation of the aircraft, the motor 32 driving backup pump 14 is disconnected from the battery 36 and does not operate. In the event that the primary pump 12 fails or the aircraft engine 22 fails, thereby causing a decrease in the pressure in line 21, the pressure responsive switch 38 will cause the electric motor 32 driving the backup pump 14 to be actuated. The backup pump 14 will then provide air pressure to operate the instruments 16, 18 and 20.

Means are also provided for heating the backup pump 14 during operation of the primary pump so as to prevent the backup pump 14 from being inoperable in the event the backup pump 14 is called into service when the plane is at high altitude or is otherwise in cold atmospheric conditions. When the airplane is at high altitude, the backup pump 14, mounted in the engine compartment, may be subjected to very cold temperatures. If the pump becomes sufficiently cold, thermal contraction of some of the components of the pump may prevent the pump from operating.

Figure 3:
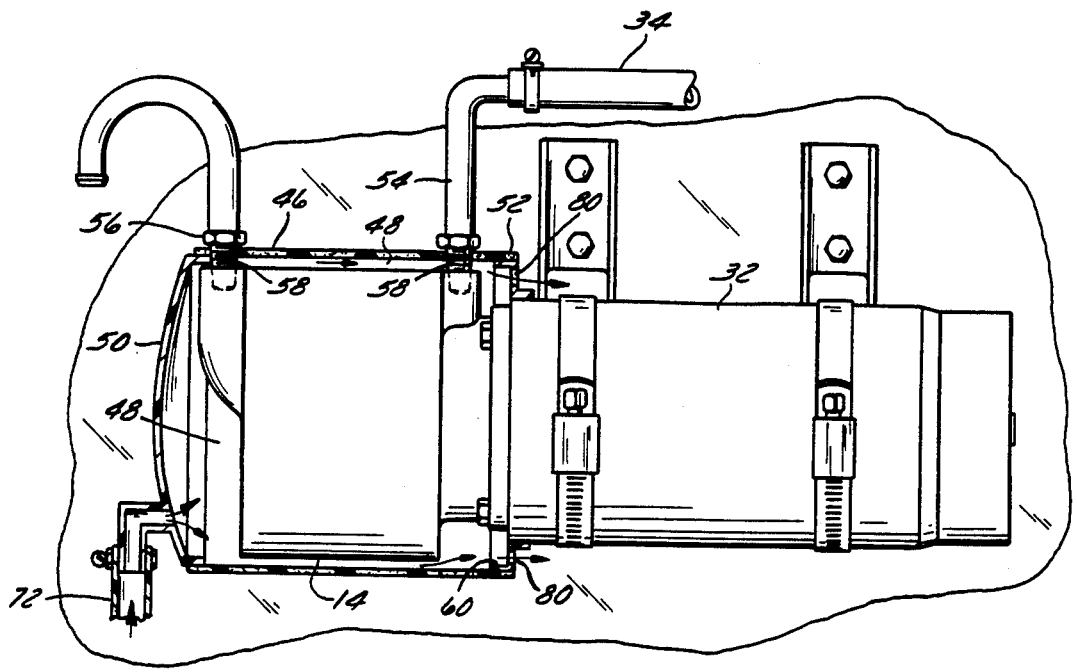
FIG. 3 is an enlarged side elevation view of a backup air pressure pump shown in FIGS. 1 and 2 and with portions cut away.
Figure 4:
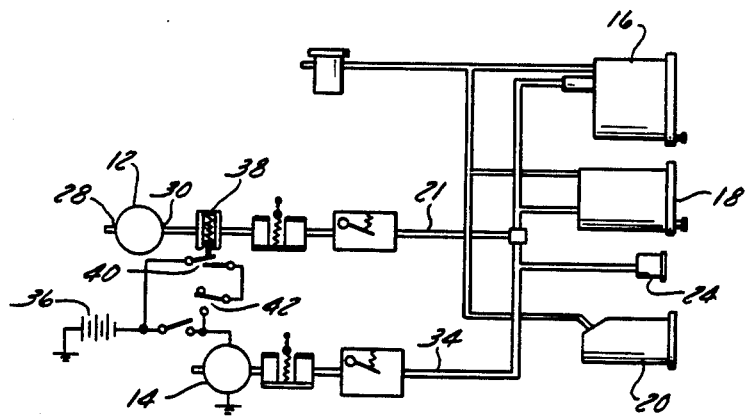
FIG. 4 is a schematic view of the air pressure operated instrument system included in the aircraft shown in FIG. 1 and embodying the invention.

In the illustrated construction, the means for heating the backup pump 14 during operation of the primary pump includes a shroud or jacket 46 adapted to surround the backup pump 14 and to provide an air space 48 (FIG. 3) around the vacuum pump 14. The jacket 46 is cylindrical and includes a closed end 50. The jacket 46 also includes an open end 52. In assembly of the backup pump 14 illustrated in the drawings, the inlet port coupling 54 and outlet port coupling 56 are threadably removed from the pump ports, and the open end 52 of the jacket 46 can be slipped over the pump 14. The jacket 46 can slide onto the pump 14 until the pump is completely housed within the cylinder defined by the jacket. The couplings 54 and 56 are then reinserted through openings 58 into the threaded ports of the pump 14. A spacer 60 is inserted into the open end 52 of the jacket 46 and surrounds the pump to maintain spacing between the cylindrical wall of the jacket 46 and the pump 14. While the spacer 60 could comprise other means for supporting the open end of the jacket with respect to the pump 14, in the illustrated construction it comprises a ring surrounding a portion of the electric motor 32.

During operation of the primary pump 12, the air discharged through the outlet port 30 of pump 12 is compressed. Compression of this air causes the air to be heated. Additionally, during operation of the primary pump, a substantial portion of the air from the primary pump 12 is discharged through the pressure relief valve 31. This air is discharged through the exhaust ports 47 at temperatures of approximately 160° to 200° F.

Means are also provided for conveying the heated air discharged through the exhaust ports 47 of the pressure relief valve 31 into the chamber defined by the jacket 46 surrounding the backup pump 14. In the illustrated arrangement the means for conveying the discharge air to the jacket 46 includes a removable housing adapted to surround the body 33 of the pressure relief valve 31 and to confine the air discharged through the exhaust ports 47. In the illustrated arrangement the removable housing is comprised of a length of flexible rubber material 61 adapted to be wrapped around the base 62 of the body 33 to cover the openings or ports 47. A pair of semicircular clamp members 64 and 66 surround the length of flexible rubber material 61 to clamp it against the base 62. The clamp members 64 and 66 are clamped together by a pair of bolts 67 extending through flanges 69 of the clamp members. An aperture 68 is provided in the length of flexible rubber material 61 and communicates with a sleeve or fitting 70 extending from the clamp member 64. A hose 72 having one end surrounding the fitting 70 has an opposite end connected to the jacket 46 surrounding the backup pump 14. The heated air discharged by the air pressure relief valve 31 is confined by the flexible rubber material 61 and the clamps 64 and 66, and this heated air is conveyed through the tube 70 and the hose 72 to the chamber defined by the jacket 46. The air flowing through the jacket 46 is then discharged through the exhaust ports 80.

In operation of the primary air pressure pump 12, the compressed air from the primary pump will be exhausted through the pressure relief valve 31, and will be conveyed to the jacket 46 surrounding the backup pump 14. This flow of heated air around the backup pump will be maintained while the primary pump is in operation. In the event that the primary pump fails, the backup pump will then be operational, even if the primary pump fails when the aircraft is in a cold atmosphere. Once the backup pump begins operating, the compression of air in the backup pump 14 results in heat generation, and the temperature of the backup pump will remain well above that required for operation of the pump.

Various features of the invention are set forth in the following claims.

I claim:

1. A pump system for use in an air operated instrument system of an aircraft, the aircraft including an engine and at least one air operated instrument, the pump system comprising:
   a primary pump, said primary pump including an air inlet port and an air outlet port discharging air under pressure,
   means for operably connecting the air operated instrument to the primary pump, said means for operably connecting including a pressure regulating valve for controlling the pressure of the air supplied to the air operated instrument, the pressure regulating valve including an air exhaust port,
   a backup pump,
   means operably connected to the backup pump for selectively driving the backup pump when the primary pump fails,
   means for selectively operably connecting the backup pump to the instrument when the primary pump fails, and
   means for heating the backup pump during operation of the primary pump, the means for heating maintaining the temperature of the backup pump above the temperature where the backup pump will be inoperable, said means for heating including means for conveying air discharged by said air exhaust port of said pressure regulating valve to said backup pump.

2. A pump system as set forth in claim 1 and further including an air chamber surrounding said backup pump, and wherein said means for conveying air discharged by said air exhaust port comprises a conduit having one end connected to the air exhaust port and an opposite end connected to said air chamber.

3. A pump system as set forth in claim 1 wherein said means for heating includes a housing surrounding said pressure regulating valve and confining the air exhausted by said presure regulating valve, a chamber surrounding said backup pump, and a conduit for providing for airflow from said housing surrounding said pressure regulating valve to said chamber surrounding said backup pump.

* * * * *